US006786655B2

(12) United States Patent
Cook et al.

(10) Patent No.: US 6,786,655 B2
(45) Date of Patent: Sep. 7, 2004

(54) METHOD AND SYSTEM FOR SELF-SERVICE FILM PROCESSING

(75) Inventors: Stacy S. Cook, Austin, TX (US); Tami A. Holk-Johnson, Austin, TX (US); Leland A. Lester, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/778,023

(22) Filed: Feb. 5, 2001

(65) Prior Publication Data

US 2001/0033752 A1 Oct. 25, 2001

Related U.S. Application Data

(60) Provisional application No. 60/180,479, filed on Feb. 3, 2000, and provisional application No. 60/180,480, filed on Feb. 3, 2000.

(51) Int. Cl.⁷ .............................................. G03D 13/00
(52) U.S. Cl. ........................ 395/569; 396/570; 355/40
(58) Field of Search .................. 396/6, 564, 567–570, 396/604, 617, 620, 599, 639; 355/27–29, 40, 41

(56) References Cited

U.S. PATENT DOCUMENTS

| 2,404,138 A | 7/1946 | Mayer ........................... 95/94 |
| 3,520,689 A | 7/1970 | Nagae et al. ................... 96/55 |
| 3,520,690 A | 7/1970 | Nagae et al. ................... 96/55 |
| 3,587,435 A | 6/1971 | Chioffe .......................... 95/89 |
| 3,615,479 A | 10/1971 | Kohler et al. ................... 96/48 |
| 3,615,498 A | 10/1971 | Aral ............................. 96/55 |
| 3,617,282 A | 11/1971 | Bard ............................ 96/59 |
| 3,747,120 A | 7/1973 | Stemme ....................... 346/75 |
| 3,833,161 A | 9/1974 | Krumbein .................... 226/92 |
| 3,903,541 A | 9/1975 | Von Meister et al. ....... 354/317 |
| 3,946,398 A | 3/1976 | Kyser et al. .................. 346/1 |
| 3,959,048 A | 5/1976 | Stanfield et al. .............. 156/94 |

(List continued on next page.)

FOREIGN PATENT DOCUMENTS

| EP | 0 261 782 A2 | 8/1987 | ............ H04N/1/46 |
| EP | 0 422 220 A1 | 3/1989 | ............ A61B/6/03 |
| EP | 0 482 790 B1 | 9/1991 | ............ H04N/1/40 |
| EP | 0 525 886 A3 | 7/1992 | ............ G03D/5/00 |
| EP | 0 580 293 A1 | 1/1994 | ............ H04N/1/04 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(List continued on next page.)

Primary Examiner—D. Rutledge
(74) Attorney, Agent, or Firm—David A. Novais; Simon, Galasso & Frantz

(57) ABSTRACT

One implementation of the invention is a self-service film processing system. In one embodiment, the self-service film processing system comprises a display and a film processing system. The film processing system operates to develop and digitize film provided by a customer to produce digital images that are then displayed to the customer. The self-service film processing system may include several additional components, such as various types of payment systems, image input systems, output devices, and customer input devices may be incorporated into the self-service film processing system. The film processing system may comprise a wet-chemistry film processing system or a digital film processing system. Another implementation of the invention is a prepaid photoprocessing card. In one embodiment, the prepaid photoprocessing card comprises a media and an encoded data device.

95 Claims, 7 Drawing Sheets

U.S. PATENT DOCUMENTS

| | | | |
|---|---|---|---|
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/77 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,652,936 A * | 7/1997 | Klees et al. | 396/564 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,147,742 A * | 11/2000 | Bell et al. | 355/27 |
| 6,174,094 B1 * | 1/2001 | Manico et al. | 396/604 |
| 6,200,738 B1 | 3/2001 | Takano et al. | 430/362 |
| 6,283,646 B1 * | 9/2001 | Dellert et al. | 396/564 |

FOREIGN PATENT DOCUMENTS

| | | | | |
|---|---|---|---|---|
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |
| WO | WO 98/19216 | 5/1998 | | G03C/5/29 |
| WO | WO 98/25399 | 6/1998 | | H04N/1/38 |
| WO | WO 98/31142 | 7/1998 | | H04N/5/253 |
| WO | WO 98/34157 | 8/1998 | | |
| WO | WO 98/34397 | 8/1998 | | |
| WO | WO 99/43148 | 8/1999 | | H04N/1/00 |
| WO | WO 99/43149 | 8/1999 | | H04N/1/100 |
| WO | WO 01/01197 | 1/2001 | | G03D/5/00 |

| | | | | |
|---|---|---|---|---|
| WO | WO 01/13174 A1 | 2/2001 | ............ | G03D/5/06 |
| WO | WO 01/45042 A1 | 7/2001 | ............ | G06T/5/00 |
| WO | WO 01/50192 A1 | 7/2001 | ............ | G03C/7/407 |
| WO | WO 01/50193 A1 | 7/2001 | ............ | G03C/7/407 |
| WO | WO 01/50194 A1 | 7/2001 | ............ | G03C/7/407 |
| WO | WO 01/50197 A1 | 7/2001 | ............ | G03C/7/42 |
| WO | WO 01/52556 A2 | 7/2001 | ............ | H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method Of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

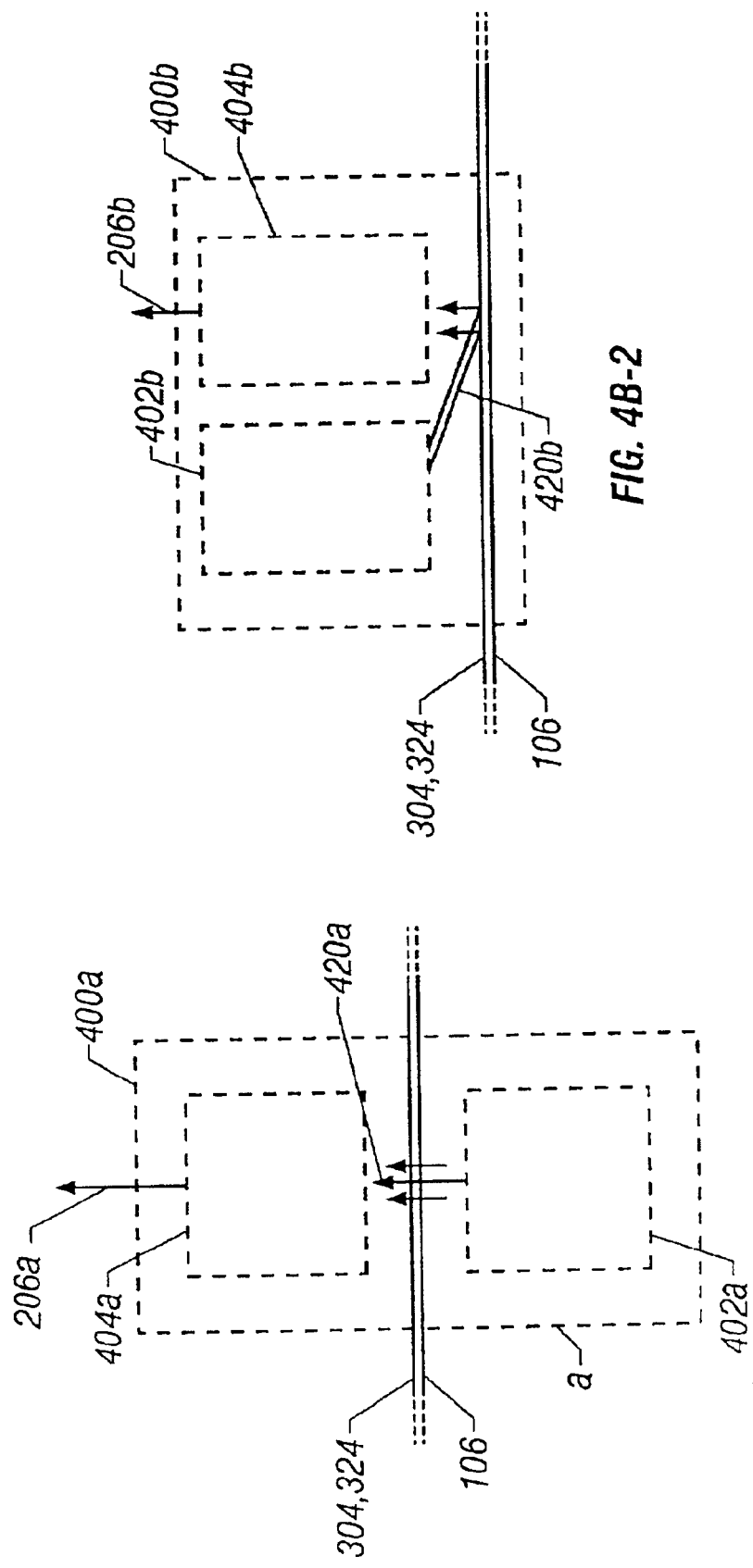

METHOD AND SYSTEM FOR SELF-SERVICE FILM PROCESSING

CROSS REFERENCE TO RELATED APPLICATIONS

This application claims benefit under 35 U.S.C. § 119(e) of the following U.S. Provisional Patent Applications: Ser. No. 60/180,479, entitled Digital Film Development Customer Interface, which was filed on Feb. 3, 2000; and Ser. No. 60/180,480, entitled System and Method for Film Development and Digital Film Processing, which was filed on Feb. 3, 2000.

This application is related to copending U.S. patent application Ser. No. 10/348,544, entitled System and Method for Digital Film Development Using Visible Light, and having a priority filing date of Dec. 30, 1999.

FIELD OF THE INVENTION

The present invention relates generally to developing and digitally processing film, and more particularly to a method and system for self-service film processing.

BACKGROUND OF THE INVENTION

Images are used to communicate information and ideas. Images, including print pictures, film negatives, documents and the like, are often digitized to produce a digital image that can then be instantly communicated, viewed, enhanced, modified, printed or stored. The flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process, as generally described below.

Conventional film processing generally involves the customer dropping off or sending a roll of exposed film to a film development lab for conventional wet chemistry development, and then returning at some later time to pick up the prints and the developed negatives. Conventional wet chemistry photo processing systems have evolved to the point that the film can be processed within one hour. However, even with the advent of one-hour photo processing, the process generally involves a high degree of customer inconvenience. For example, picking up the prints and developed negatives often requires a second trip and the photographic prints and negatives can only be picked up when an attendant or technician is on duty. Another problem is that the pictures are often developed in view of the public. This can create problems when sensitive pictures are developed, such as in the case of trade secrets or confidential information. In the case of mailing developed negatives and the prints to the customer, there is always a possibility that the prints or negatives could be damaged or lost during shipment.

Conventional film processing generally requires the customer to provide specific instructions as to the number of prints and any specialized requirements. These instructions cannot be changed and once the film has been developed, the film cannot be redeveloped. In addition, additional prints or modifications to the prints are requested after the customer has reviewed the prints. This requires the customer to provide the negatives and return at another time to pick-up the prints. In many cases, the instructions, such as lightening, cropping and the like, are not followed exactly or the customer is not fully satisfied. The customer must then go through another round changes. This is time intensive and inconvenient for the customer. Furthermore, conventional film processing systems and methods may not be able to accommodate some requests; even if a customer makes the requests at the time the film is developed. For example, a customer is unlikely to be able to receive both black and white and full color images from a single roll of film.

SUMMARY OF THE INVENTION

One implementation of the invention comprises a self-service film processing system. One embodiment of the self-service film processing system comprises a film processing system and a display. The film processing system operates to develop and digitize film received by the customer to produce one or more digital images. In a particular embodiment, the film processing system comprises a digital film processing system that develops and digitizes the film to produce the digital images. The digital images are then displayed to the customer. The self-service film processing system includes may include one or more customer input devices that allow the customer to interact with the self-service film processing system. For example, the customer can choose the particular digital images to print, store, or otherwise output. The customer can also enhance the digital images using various image correction programs.

Another implementation of the invention comprises a self-service digital film processing system. In this embodiment, the self-service digital film processing system comprises a customer interface, a development system, a scanning system, and a data processing system. The customer interface includes a display and a film receptacle that operates to receive undeveloped film from a customer. The development system operates to coat a processing solution onto the undeveloped film and develop the film. The scanning system operates to scan the coated developed film and produce sensor data. The data processing system operates to receive the sensor data and produce digital images that are displayed on the display to the customer. In a particular embodiment, the self-service digital film processing system includes one or more output devices, such as a printer, communication network, archival memory, and a memory device. In the preferred embodiment, the self-service digital film processing system allows the customer to choose which digital images to be output, what output device to be used, and in what form the digital images are to be output.

Yet another implementation of the invention comprises a method for allowing a customer to process their own photographic film. In one embodiment, the method comprises inserting the undeveloped film into a self-service film processing system; developing the film within the self-service film processing system; scanning the developed film within the self-service film processing system to produce digital images; and displaying one or more of the digital images to the customer at the self-service film processing system. In a particular embodiment, the method includes displaying the digital images and enhanced digital images to the customer to allow the customer to choose between the digital images and the enhanced digital images.

A further implementation of the invention comprises a prepaid photoprocessing card. In one embodiment, the prepaid photoprocessing card comprises a media and an encoded data device coupled to the media, the encoding data device contains a money balance operable to be used for payment in a self-service film processing system. In a particular embodiment, the encoded data device also contains demographic data stored on the encoded data device prior to use of the prepaid photoprocessing card by the customer.

An advantage of at least one embodiment of the invention is that customer convenience is improved. In particular, the customer is not required to make multiple trips to process their film and film processing becomes a one-stop process.

A further advantage of at least one embodiment is that the customer views the digital images and decides which digital images to print and otherwise output. In addition, the customer can make changes to the digital images before the digital image are printed or otherwise output. As a result, waste resulting from printing unwanted digital images is reduced.

Other advantages will be readily apparent to one skilled in the art from the following figures, descriptions, and claims.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIGS. 3B-1–3B-4 are block diagrams illustrating various embodiments of a processing station shown in FIG. 3A;

FIGS. 4B-1–4B-4 are block diagrams illustrating various embodiments of a scanning station shown in FIG. 4A.

DETAILED DESCRIPTION OF THE INVENTION

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
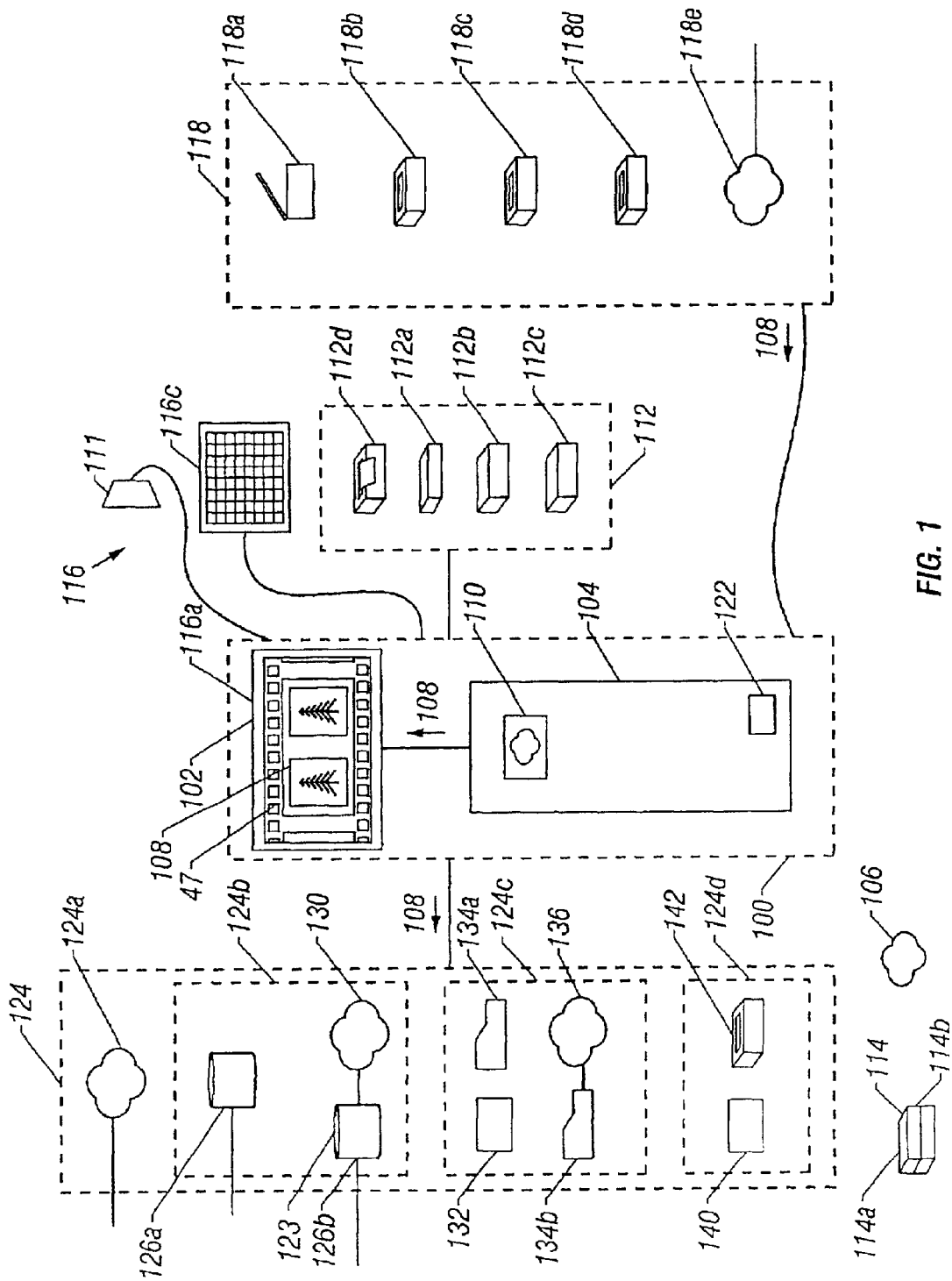
FIG. 1 is a block diagram of a self-service film processing system in accordance with the invention.

FIG. 1 illustrates a self-service film processing system 100 in accordance with one embodiment of the invention. In the embodiment illustrated, the self-service film processing system 100 comprises a display 102 and a film processing system 104. The film processing system 104 operates to receive a roll of film 106 from a customer (not expressly illustrated). Film 106, as used herein, includes color, black and white or any other suitable type of film and is not meant to refer to any specific type of film or a specific manufacturer. The film processing system 104 develops and digitizes the film 106 to produce one or more digital image 108 corresponding to the images stored on the film 106. The digital images 108 are then displayed to the customer on the display 102. In the preferred embodiment, the customer can then choose the specific digital images 108 to be output, if at all, and in what form the output shall take. For example, as described in greater detail below, various embodiments of the invention allow the customer to have the chosen digital images 108 printed, stored, sent to friends, or output in any other suitable manner. In general, the self-service film processing system 100 allows a customer to develop and process their own film 106 without requiring the use or assistance of a skilled film processing technician.

Display 102 may comprise any suitable device for displaying digital images 108 to the customer. For example, the display 102 may comprise a cathode ray tube (CRT), plasma display, liquid crystal display (LCD), and the like. In the preferred embodiment, the display 102 comprises a touch screen display, such as an Elo Entuitive 1745C CRT touch screen display available from Elo TouchSystems, Inc., of Fremont, Calif. In this embodiment, the touch screen display 102 also operates as a customer input device, as further described below.

The film processing system 104 develops the film 106 and produces digital images 108 from the developed film 106. In the preferred embodiment, the film processing system 104 comprises a digital film processing system 104a, as described in detail in FIGS. 2–4. In this embodiment, the film 106 is developed without producing environmentally harmful effluents. In another embodiment, the film processing system 104 comprises a conventional wet chemistry film processing system, such as those available from Eastman Kodak, Inc., of Rochester, N.Y. If conventional wet chemistry film processing system is used, then the developed film negative can be saved, and delivered to the customer. However, in general, conventional wet chemistry film processing systems are larger than digital film processing systems and are not as well suited for self-service applications, such as a kiosk.

Film processing system 104 includes a film receptacle 110 operable to receive the film 106 from the customer. In the preferred embodiment, the film receptacle 110 includes a cover to prevent contaminates from entering the film processing system 104. To prevent vandalism, the cover may be operated only after the customer has input customer information, such as credit card information. The film processing system 104 may include other suitable devices without departing from the invention. For example, the film processing system 104 preferably includes replaceable chemical containers containing the film processing solutions needed develop and process the film 106. In this manner, the film processing system 104 operates as a stand-alone system, such as a kiosk.

The self-service film processing system 100 may include a sound system 111. In general, the sound system 111 helps guide the customer through the operation of the self-service film processing system 100. The sound system 111 may also include one or more microphones that detect voice commands from the customer. The sound system 111 may also operate to produce music, white noise, promotional or marketing ads, and the like.

The self-service film processing system 100 may include a payment system 112. In this embodiment, the payment system 112 collects the payment associated with the services provided by the self-service film processing system 100. The amount of payment varies in accordance with the options chosen by the customer. For example, the customer may choose to print certain digital images 108 in a 4×6 format and other digital images 108 in a 8×10 format, as well as storing all the digital images 108 on a CD. This options package will cost less than if the customer only wanted to save the digital images 108 on a CD.

In the preferred embodiment, the payment system 112 comprises a card reader 112a. The card reader 112a accepts payment cards, such as a smart card or a card containing an encoded magnetic strip. The card reader 112a preferably allows the use of credit cards, debit cards, and prepaid cards to be used by the customer to pay for services at the self-service film processing system 100. In another embodiment, the payment system 112 includes a currency receptacle 112b. The currency receptacle 112b preferably accepts paper currency and may also accept coin currency. In yet another embodiment, the payment system 112 includes a reader 112c. In this embodiment, the reader 112c may comprise a bar code reader. Services for the self-service film processing system 100 can be prepaid at a cashier and the cashier provides the customer with a receipt having a printed bar code that can be read by the reader 112c. In yet another embodiment, the payment system 112 comprises a receipt printer 112d. In this embodiment the receipt printer 112d prints a receipt that is provided to a cashier and the customer pays the cashier for the services provided by the self-service film processing system 100. In the preferred embodiment, the receipt printer 112d prints a receipt having a bar code, which can be read by a scanner by the cashier. This embodiment is particularly useful in embodiments in which prints of the digital image 108 are not made at the self-service digital film processing system 100, but are printed in an area controlled by the cashier. In this embodiment, the customer would receive the prints corresponding to the receipt when the receipt is paid by the customer. The payment system 112 may comprise any one or combination of the disclosed payment system 112, as well as any other suitable system for allowing the customer to pay for the services of the self-service film processing system 100. For example, the payment system 112 may comprise an automatic billing system based on the identity of the customer.

A prepaid photoprocessing card 114 in accordance with one embodiment of the invention is provided. In one embodiment, the prepaid photoprocessing card 114 comprises a media 114a, such as plastic, having an encoded data device 114b, such as a magnetic strip or smart chip, containing payment data. The payment data preferably includes the balance of prepaid money remaining on the prepaid photoprocessing card 114 and updates the balance as the services of a self-service film processing system 100 are utilized by the customer. In some embodiments, the customer can increase the balance on the prepaid photoprocessing card 114 through the use of a payment station that accepts monies or other payment cards to prepay additional monies to have the balance correspondingly increased on the prepaid photoprocessing card 114. In other embodiments, the prepaid photoprocessing cards 114 are purchased in various currency increments. In a particular embodiment, the prepaid photoprocessing card 114 also includes customer data, such as demographical data. In this embodiment, the prepaid photoprocessing card 114 is particularly suited to aid in marketing activities, such as promotional activities. For example, free prepaid photoprocessing cards 114 having respective demographical data encoded into the photoprocessing cards 114 can be sent to customers. The use of the prepaid photoprocessing card 114 by the customer produces marketing data corresponding to the use of the self-service film processing system 100.

The self-service film processing system 100 may include one or more customer input devices 116. In this embodiment, the customer input device 116 allows the customer to input data or interact with the self-service film processing system 100. For example, the customer can make various decisions regarding the digital images 10:8, including choosing which digital images 108 are desired, enhancements to the digital images 108, printing options, and output options. In one embodiment, the display 102 also operates as a customer input device 116a. In this embodiment, the display 102 comprises a touch screen display, as described earlier. In another embodiment, the display includes various buttons 117 corresponding to customer choices and menus located on the display 102. In this embodiment, the customer presses specific buttons to make choices. In yet another embodiment, the customer input device 116 comprises a keypad 116c, such as a keyboard and the like. In this embodiment, the customer can easily enter data into the self-service film processing system 100. For example, in some embodiments, the self-service film processing system 100 allows the customer to create greeting cards, add commentary, enter email or website information, address information, billing information, or enter other suitable customer information.

The self-service film processing system 100 may include one or more image input devices 118. In this embodiment, the image input devices 118 allows the customer to input a digital image 108. In this embodiment, the digital image 108 generally originates from a source other than the self-service film processing system 100. In one embodiment, the image input device 118 comprises a flatbed image scanner 118a. Flatbed image scanners 118a operates to reflectively scan a print to produce the digital image 108. Flatbed image scanners 118a are commercially available from several companies, such as Hewlett Packard, of Palo Alto, Calif.

In another embodiment, the image input device 118 comprises a film scanner 118b. Film scanners 118b operate to transmissively scan film negatives, positives, transparencies and the like to produce the digital image 108. Film scanners 118b are commercially available from several companies, such as Nikon Corporation of Tokyo, Japan.

In yet another embodiment, the image input device 118 comprises a signal input 118c. The signal input 118c operates to receive the digital image 108 from an image recording device, such as a digital camera, video recorder, laptop computer, and the like. For example, in the preferred embodiment, the signal input 118c comprises a flash card reader. The signal input 118 may also comprise a serial connection, parallel connection, universal serial bus (USB) connection, standard telephone connection, optical connection, or any other connection useful for inputting digital image 108. Digital cameras, video recorders, and the like, have become prevalent and the signal input 118c allows the customer to use the same or similar services of the self-service film processing system 100 to enhance, print, store, and otherwise output the digital image 108 obtained from these devices.

In yet another embodiment, the image input device 118 comprises a storage media reader 118d. The storage media reader 118d operates to read the digital image 108 saved on a storage media. The particular type of storage media reader 118d generally depends upon the type of storage media used to store the image data. For example, the storage media may comprise a floppy disk, CD, DVD, or any other suitable type of storage media.

In yet another embodiment, the image input device 118 comprises a communications network 118e. The communications network 118e operates to communicate with an external network, such as the Internet, to receive the digital image 108. In one embodiment, the communications network 118 operates in conjunction with an Internet website to receive the digital image 108. In another embodiment, the communications network 118e includes a network of self-service film processing systems 100. In this embodiment, the customer can access digital images 108 produced at a different self-service film processing systems 100 or stored in an archive. Although specific embodiments of the image input device 118 are described, the image input device 118 may comprise any one or combination of the image input devices described above, as well as any other suitable device or system for inputting digital image 108.

The self-service film processing system 100 may include one or more imaging programs 122. In one embodiment, imaging programs 122 operate to correct or enhance the digital image 108. For example, imaging programs 122 may include software programs for red-eye removal, cropping, color correction and management, artifact removal, softening and the like. In another embodiment, imaging programs 122 operate to produce composites of the digital image 108. For example, imaging programs 122 may include software for creating greeting cards, merging multiple images, and the like.

The self-service film processing system 100 may include one or more output devices 124. The output devices 124 allow the customer to communicate, store, print, and otherwise output the digital image 108 and/or image data. In one embodiment, the output device 124 comprises a communications network 124a. In this embodiment, the communications network 124a operates to output the digital image 108 over a network, such as the Internet. In particular, the communications network 118e and the communications network 124a are similar and may comprise the same network I/O port operable to input and output the digital image 108. At least one embodiment of the communications network 118e/124a implements communication through an Internet web site. As known to those skilled in the art, an Internet web site is a collection of web pages, usually linked through an index, or home page. Each web page is a file (a collection of programming instructions) configured to display a number of objects on a computer screen. Some of these objects are simple images used only for display. Other objects are configured such that when a user positions a pointing device, such as a mouse, over the object and "clicks" on the object, a series of instructions is carried out. These instructions may include printing, downloading files, linking to another Internet web page within the current Internet web site, or accessing another Internet web site.

In another embodiment, the output device 124 comprises a storage system 124b. The storage system 124b operates to store the digital images 108 for a certain limited time period. In one embodiment, the storage system 124b comprises one or more mass storage devices 126a. In this embodiment, the mass storage devices 126a comprise any suitable type of electronic digital data storage and retrieval system, usually consisting of a processor controlled storage media. The control processor may be integral the storage system or separate, such as a personal computer or similar computing device. The storage media may be electronic components, such as EEPROM, NVRAM, or RAM; conventional hard disk drive; CDROM residing in a multi-disk retrieval system; or based on any other high capacity digital storage strategy. In a particular embodiment, the mass storage device 126a can be accessed externally. In this embodiment, the digital images 108 stored on the mass storage devices 126a can be accessed by the customer using another self-service film processing system 100 or through an Internet web site, as described in greater detail below.

In another embodiment, the storage system 124b comprises an external memory system 128. In this embodiment, external memory system 128 comprises one or more mass storage devices 126b, as described above for 126a, coupled to the film processing system 104 by a communications network 130, such as the Internet or an optical link. This embodiment is particularly suited for archiving the digital image 108 at a single location. Thereby allowing faster and easier access to the digital images 108. This may facilitate access for an Internet web site, as described below.

The self-service film processing system 100 preferably operates in conjunction with an Internet web site having access to the storage system 124b. The Internet web site is preferably configured to communicate via password with the customer. In particular, the customer may access the digital image 108 and use the tools provided in the Internet web site to modify the digital images 108. For example, the tools may include compositing, image enhancement, and any other suitable image processing tools. The Internet web site may also allow the customer to select various services. For example, as described in greater detail below, the customer can request specialized printing and delivery options, including the production of negatives, slides, or prints, to be delivered to the customer via mail, rush delivery, and the like.

In the preferred embodiment, the output device 124 comprises a printing system 124c. The printing system 124c operates to print the selected digital images 108 onto a print media to produce prints 132. Prints 132, as used herein, includes printed images on paper, film negatives, photographic slides, positives, photographic prints using silver halide based paper, and the like. In the preferred embodiment, the printing system 124c comprises a local printer 134a. In this embodiment, the customer can immediately obtain the prints 132 upon completing the transaction. In particular, the local printer 134a may be located in a kiosk with the film processing system 104 or located in proximity to the film processing system 104, such as behind a cashiers counter.

The preferred embodiment of the local printer 134a is an ink-jet printer. Inkjet printers provide high quality at a relatively low per sheet cost. In another embodiment, the local printer 134a comprises a dye sublimation printer. Dye sublimation printers produce high quality prints 132 at relatively high prices. In yet another embodiment., the local printer 134a comprises a conventional silver halide photographic print process. This embodiment is particularly well suited for integrating the self-service film processing system 100 with a conventional photographic lab. In particular, the self-service film processing system 100 can deliver the specified digital images 108 to the conventional digital minilab printer to produce prints 132. The local printer 134a may also comprise other suitable types of printers, such as laser printers, wax printers, paper compression printers, and the like.

In another embodiment, the printing system 124c comprises a remote printer 134b coupled to the film processing system 104 by a communications network 136. In this embodiment, the remote printer 134b may comprise similar embodiments as local printer 134a described above. Remote printer 134b may also comprise high-speed printers and large format printers that would not generally be locally available to the customer. The communications network 136 is similar to the communications network 130 described above. The remote printer 134b allows the customer to order prints 132 and have the prints 132 shipped to the customer or to others designated by the customer. This allows for specialized printing of the specified digital images 108 that cannot generally be accomplished by the local printer 134a.

In yet another embodiment, the output device 124 comprises a memory system 124d operable to store the digital images 108 onto a storage media 140. The memory system 124d comprises any suitable memory device 142 operable to store the digital images 108 onto the storage media 140. For example, the memory device 142 may comprise a floppy drive, CD writer, DVD writer, flash card memory, any combination thereof, and any other suitable memory storage system.

Although several examples of output devices 124 have been illustrated, the output device 124 may comprise any one or combination of the above describe examples, as well as any other suitable device or system for outputting the digital images 108. In addition, although various embodiments of the self-service film processing system 100 has been described, the self-service film processing system 100 may comprise other suitable devices and systems without departing from the spirit and scope of the invention. For example, different types of output devices 124 can be utilized, such a printer that prints banners and the like.

The self-service film processing system 100 may be used in the following manner. The customer enters payment data via the payment system 112. Upon entering the payment data, the cover protecting the film receptacle 110 is opened and allows the customer to deposit the film 106 within the film receptacle 110. The film 106 is removed from the film canister and developed and digitized by the film processing system 104 to produce digital images 108. The customer chooses various options using the customer input device 116 to choose specific digital images 108, the output device 124, the number of copies, any enhancements using the imaging programs 122, and the like. The chosen digital images 108 are then output to the appropriate output devices 124. The customer can then leave with the requested output media.

Figure 2:
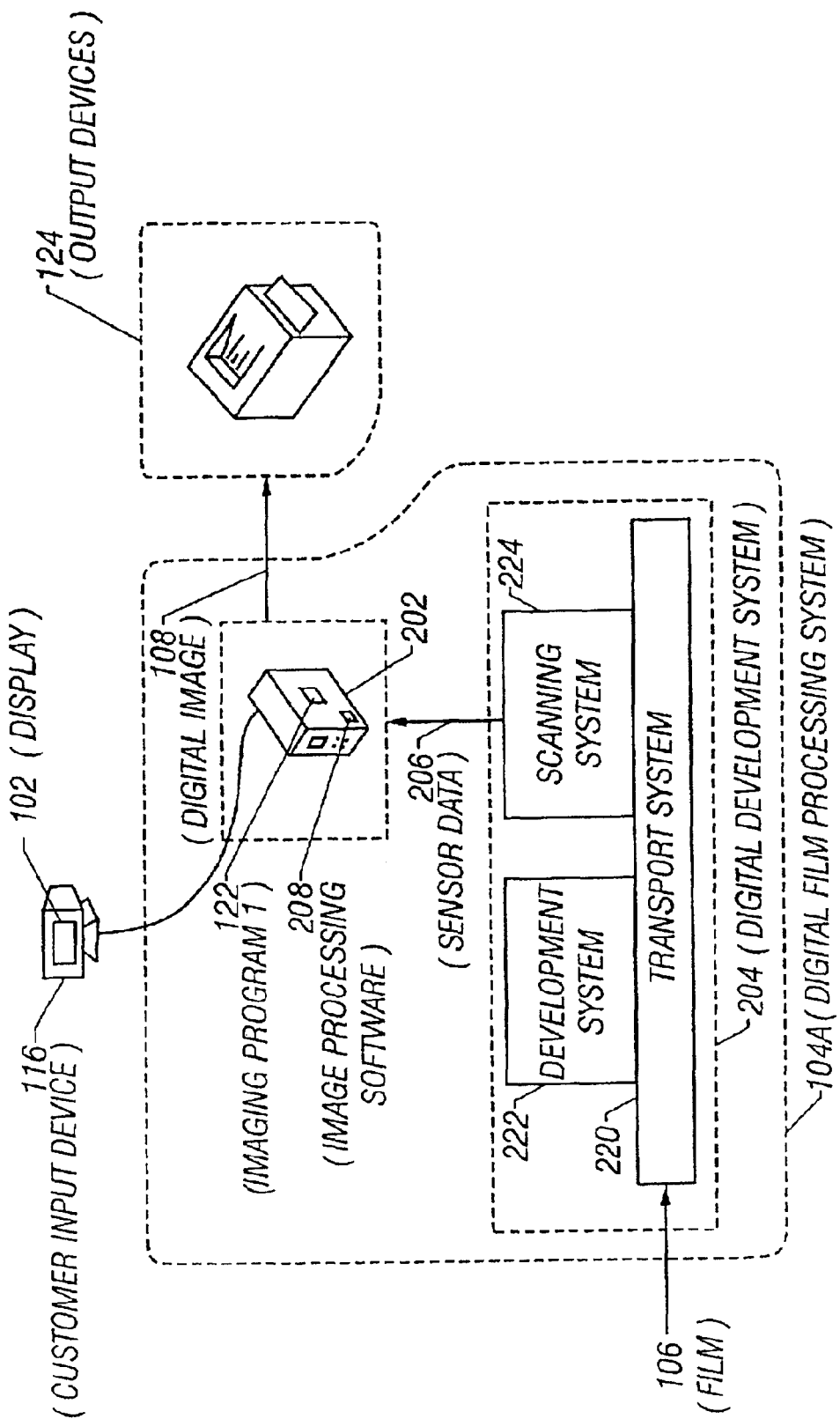
FIG. 2 is a block diagram of a digital film processing system in accordance with the invention.

FIG. 2 illustrates a digital film processing system 104a in accordance with the invention. In this embodiment, digital film processing system 104a comprises a data processing system 202 and a digital development system 204. The digital development system 204 develops and digitizes the film 106 to produce sensor data 206 that is communicated to the data processing system 202. The data processing system 202 processes; the sensor data 206 to produce digital images 108 that are displayed to the customer on display 102 and can be output to one or more output devices 124 in accordance with the customers instructions received via the customer input device 116.

Data processing system 202 comprises any type of computer or processor operable to process data. For example, data processing system 202 may comprise a personal computer manufactured by Apple Computing, Inc. of Cupertino, Calif. or International Business Machines of New York. Data processing system 202 may also comprise any number of computers or individual processors, such as application specific integrated circuits (ASICs). In one embodiment, the data processing system 202 is coupled directly to the digital development system 204. In this embodiment, high data transfer rates can be achieved to allow data processing system 202 to process the sensor data 206 and produce the digital image 108 in a minimum amount of time. In another embodiment, the data processing system 202 is remote to the digital development system 204. In this embodiment, the sensor data 206 is transmitted over a communications network, such as the Internet, from the digital development system 204. Although this adds to the time and complexity to the production of the digital image 108, a single data processing system 202 can support multiple film development 204. As a result, the cost is reduced and software upgrades can be easily implemented.

Data processing system 202 includes image processing software 208 and any imaging programs 122 resident on the data processing system 202. Data processing system 202 receives sensor data 206 from the digital development system 204. As described in greater detail below, sensor data 206 is representative of the image data and silver in the film 106 at each discrete location, or pixel, of the film 106. The sensor data 206 is processed by image processing software 208 to produce the digital image 108. The specific embodiment of the image processing software 208 is dependent upon the embodiment of the digital development system 204, and in particular, the specific embodiment of the scanning system, as described below. In an embodiment in which metallic silver grains and/or silver halide remains within the film 106, the image processing software 208 operates to compensate for the silver in the film 106. For example, one embodiment of image processing software 208 comprises software based on U.S. patent application Ser. No. 08/999,421, entitled Defect Channel Nulling, which is incorporated herein by reference. In this embodiment, any silver remaining in the film 106 is treated as a defect and each individual pixel color record is compensated to remove the effect of the silver. In an embodiment in which the metallic silver grains and silver halide have been modified to a substantially transparent silver compound, the film 106 may be scanned using only visible light without digitally compensating for any occlusions. Processing the film 106 without washing the silver from film 106 substantially reduces or eliminates the production of hazardous chemical effluents that are generally produced during conventional film processing methods. Although the image processing software 208 is described in terms of actual software, the image processing software 208 may be embodied as hardware, such as an ASIC. The color records for each pixel form the digital image 108, which is then communicated to one or more output devices 124.

As described in greater detail below, digital development system 204 operates electronically scan the film 106 to produce the sensor data 206. Light used to scan the film 106 may include light within the visible portion of the electromagnetic spectrum, light within the infrared portion of the electromagnetic spectrum, a combination of visible and infrared light, or any other suitable electromagnetic radiation. As illustrated, digital development system 204 comprises a transport system 220, a development system 222, and a scanning system 224.

Transport system 220 operates to dispense and move the film 106 through the digital development system 204. In a preferred embodiment, the transport system 220 comprises a leader transport system in which a leader is spliced to the film 106 and a series of rollers advances the film 106 through the digital development system 204, with care taken that the image surface of the film 106 is not contacted. Similar transport systems 220 are found in film products manufactured by, for example, Noritsu Koki Co. of Wakayama, Japan, and are available to those in the art.

Figure 3A:
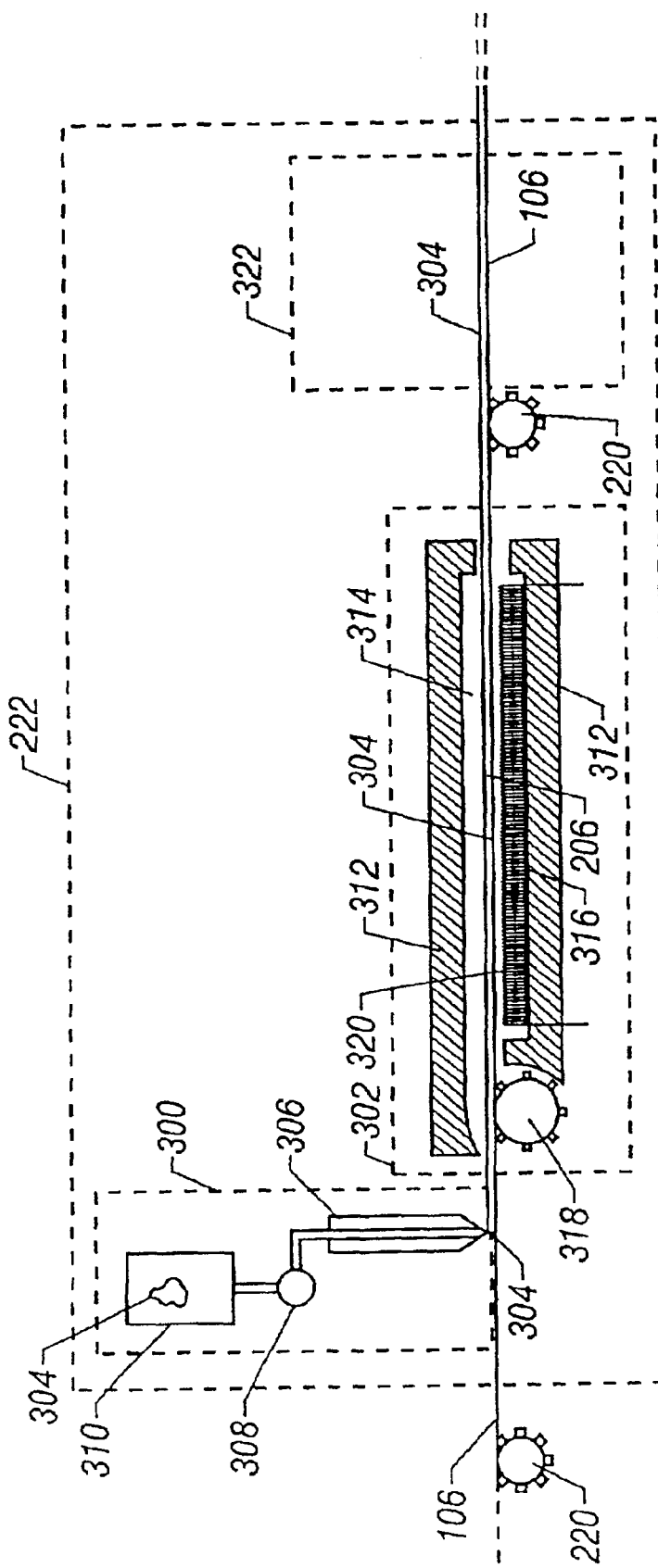
FIG. 3A is a block diagram illustrating a development system as shown in FIG. 2.

The development system 222 operates to apply one or more processing solutions to the film and develop the film 106, as described in greater detail in FIG. 3A. In the preferred embodiment, the processing solution comprises a viscous color developer solution that initiates production of the metallic silver grains and the magenta, cyan and yellow dye images within the film 106. In an alternative embodiment, the processing solution comprises a black and white developer solution that initiates production of the metallic silver grains within the film 106. The processing solution may include other suitable processing solutions. The development system 222 may also apply other suitable processing solutions, such as stop solutions, inhibitors, accelerators, bleach solutions, fixer solutions, blix solutions (combines the functionality of a bleach solution and a fixer solution), stabilizers and the like.

Figure 4A:
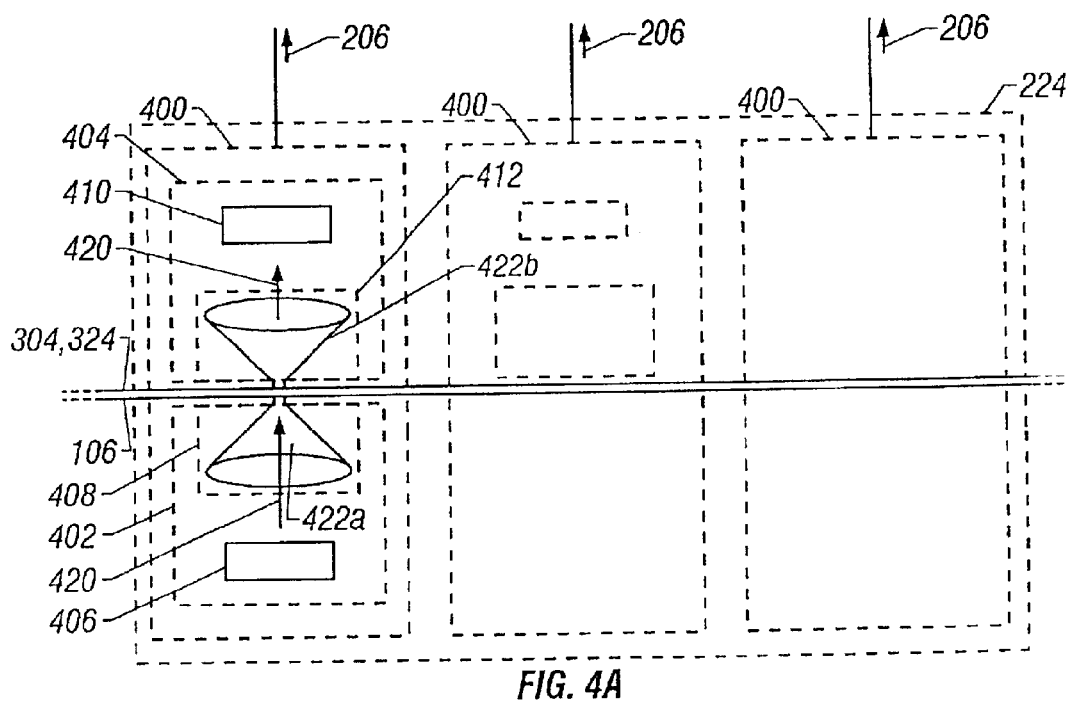
FIG. 4A is a block diagram illustrating a scanning system shown in FIG. 2.

The scanning system 224 scans the film 106 through the processing solutions applied to the film 106, as described in greater detail in FIG. 4A. In other words, the processing solutions are not substantially removed from the film 106 prior to the scanning process. In contrast, conventional film processing systems wash the contaminated processing solutions and hazardous silver compounds from the film and then dries the film to create a conventional film negative prior to any digitization process. The scanning station 224 may comprise a number of different configurations depending, in part, on how the film 106 was developed. In general, specific colors of visible light interact with the dye images and any silver present in the film 106, and infrared light interacts with the silver in the film 106. In some embodiments of the development system 222, the silver (metallic silver and/or silver halide) is modified to reduce the optical effects of the silver. For example, a bleaching agent may be applied to the film 106. The bleaching agent operates to oxidize the metallic silver grains within the film 106 to produce silver halide. The silver halide has a lower optical density than the metallic silver grains. As a result, a greater amount of light is transmitted through the film 106. Another example is a fixer agent. A fixer agent dissolves the silver halide to produce a silver compound that is substantially transparent to light. As a result, light is readily transmitted through the film 106.

The scanning station 224 scans the film 106 using electromagnetic radiation and produces sensor data 206 representative of the film image data. In the preferred embodiment of the scanning station 224, the film 106 is scanned with light within the visible and infrared portions of the electromagnetic spectrum. The visible light measures the light intensity associated with the dye clouds as well as the silver within the film 106, and the infrared light measures the light intensity associated with the metallic silver grains within the film 106. In particular, one or more bands of visible light may be used to scan the film 106. For example, the film 106 may be scanned using visible light within the red, green and/or blue portions of the electromagnetic radiation spectrum. In other embodiments of the scanning station 224, the film 106 is scanned with only visible light, with only infrared light, with different combinations of visible light, or any other suitable electromagnetic radiation. The processing solutions are not substantially removed prior to scanning the film 106. In contrast, conventional film processing systems wash all the processing solutions and silver, both silver halide and metallic silver, from the film 106 prior to any conventional scanning processes. Silver, whether metallic silver or silver halide crystals, in the film negative interferes with the transmission of light through the film negative and would be digitized along with the image. Any silver in the film negative would appear as defects in the resulting digital image.

In operation, exposed, but undeveloped film 106 is fed into the transport system 220 from the film receptacle 110. The film 106 is transported through the development system 222. The development system 222 applies a processing solution to the film 106 that develops the film 106. The transport system 220 moves the film 106 through the scanning system 224. The scanning system 224 illuminates the film 106 with light. Light from the film 106 is measured by the sensor system, which produces sensor data 206. The sensor data 206 represents film image data in the film 106 at each pixel. The sensor data 206 is communicated to data processing system 202. The data processing system 202 processes the sensor data 206 using image processing software 208 to produce the digital image 108. The data processing system 202 may also operate to enhance or otherwise modify the digital image 108 using any imaging programs 122. The data processing system 202 communicates the digital image 108 to the display 102 for viewing.

The digital film processing system 104a is particularly well suited to use in the self-service film processing system 100. In particular, no plumbing is required to operate the digital film processing system 104a. In addition, the digital image 108 can be prescreened by the customer before they are printed or otherwise output, thereby reducing costs and improving customer satisfaction. In addition, the digital film processing system 104a can be packaged in a relatively small size to reduce the amount of floor space required. As a result of these advantages, the self-service film processing system 100 can be located in hotels, college dorms, airports, copy centers, or any other suitable location.

FIG. 3A illustrates one embodiment of the development system 222. In this preferred embodiment, a development system 222a comprises an applicator station 300 and a development station 302. The applicator station 300 operates to apply a relatively uniform coating of a processing solution 304 to the film 106. In one embodiment, the processing solution 304 comprises a color developer solution, such as Flexicolor Developer for Process C-41 available from the Eastman Kodak Company. In other embodiments, the processing solution 304 comprises other suitable solutions. For example, the processing solution 304 may comprise a monobath solution that acts as a developer and stop solution.

In a particular embodiment, the applicator station 300 comprises an applicator 306, a fluid delivery system 308, and a reservoir 310. The applicator 306 operates to coat the film 306 with the processing solution 304. In the preferred embodiment, as illustrated, the applicator 306 comprises a slot coater device. In alternative embodiments, the applicator 306 comprises an ink jet applicator, a tank, an aerosol applicator, drip applicator, sponge applicator, or any other suitable device for applying the processing solution 304 to the film 106. The fluid delivery system 308 delivers the processing solution 304 from the reservoir 310 to the applicator 306. In an embodiment in which the applicator 306 comprises a slot coater device, the fluid delivery system 308 generally delivers the processing solution 304 at a constant volumetric flow rate to help insure uniformity of coating of processing solution 304 on the film 106. The reservoir 310 contains a sufficient volume of processing solution 304 to process multiple rolls of film 106. In the preferred embodiment, the reservoir 210 comprises a replaceable cartridge. In other embodiments, the reservoir 310 comprises a refillable tank. The applicator station 300 may comprise other suitable systems and devices for applying the processing solution 304 to the film 106.

The development station 302 operates to give the film 106 time to develop prior to being scanned by the scanning system 224. In the embodiment illustrated, the development station 302 forms that portion of the transport system 220 between the applicator 306 and the scanning system 224. The length of the development station 302 is generally dependent upon the development time of the film 106. In particular, depending upon the environment and chemical nature of the processing solution 304, development of the film 106 may require as little as a few seconds to as long as several minutes.

As illustrated, the development station 302 comprises a cover 312 that protects the film 106 during development. The cover 312 forms an environmental chamber 314 surrounding the film 106. The temperature and humidity within the environmental chamber 314 are strictly controlled. To facilitate controlling the temperature and humidity, the environmental chamber 314 has a minimum volume surrounding the film 106. The cover 312 may be insulated to maintain a substantially constant temperature as the film 106 is developed. In order to maintain the temperature, the development station 302 preferably includes a heating system 316. As illustrated, the heating system 316 may include a heated roller 318 and heating element 320. In addition, the heating system 316 may include a processing solution heating system (not expressly shown) that heats the processing solution 304 prior to its application to the film 106.

Figures 1, 3B:
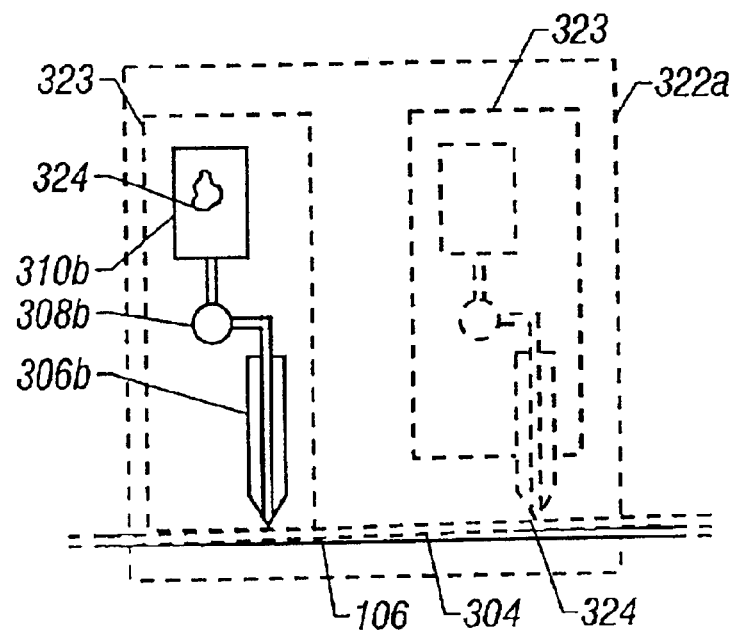
Figures 2, 3B:
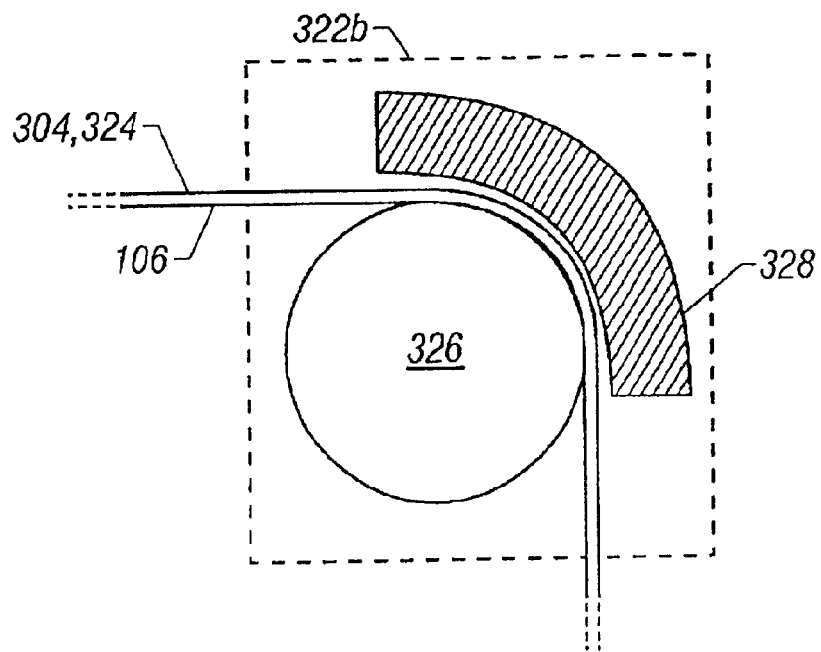

In an alternative embodiment, the development system 222 includes a processing station 322. The processing station 322 operates to further process the film 106 prior to being scanned by the scanning system 224. For example, in on embodiment, the processing station 322 operates to modify the metallic silver grains and or silver halide in the film 106. Modifying the silver within the film 106 decreases the opacity of the film 106, thereby improving the transmissivity of light through the film 106. In another embodiment, the processing station 322 operates to retard or substantially reduce the continued development of the film 106. Retarding or substantially stopping the continued development of the film 106 increases the amount of time the film 106 can be exposed to visible light without substantially fogging of the film 106. In another embodiment, the processing station 322 operates to modify the silver and also substantially reduce the continued development of the film 106. FIGS. 3B-1–3B4 illustrate different examples of the processing station 322.

In operation, transport system 220 transports the film 106 through the applicator station 300. Fluid delivery system 308 dispenses the processing solution 304 from the reservoir 310 through the applicator 306 onto the film 106. The processing solution 304 initiates development of the dye image and silver image within the film 106. The coated film 106 is then transported through the development station 302. As discussed above, the development station 302 allows the film 106 time to develop within a controlled environment. In an alternative embodiment, the film 106 is then transported through the processing station 322 where the film 106 is further processed. The film 106 is then transported by the transport system 220 to the scanning system 224. As described above, the processing solution 304 coated on the film 106 is not substantially removed, but remains on the film 106 as the film 106 is transported to the scanning system 224.

FIG. 3B-1 illustrates one embodiment of a processing station 322a. The processing station 322a comprises one or more applicator stations 323 that operate to apply one or more processing solutions 324 to the film 106. As illustrated, the applicator station 323 comprises an applicator 306b, a fluid delivery system 308b, and a reservoir 310b, similar in function and design as applicator station 300 described in FIG. 3A. The processing station 322a may comprise any number of applicator stations 323 as required to apply suitable processing solutions 324 to the film 106. The processing solution 324 may comprise any suitable chemical applied to the film 106 to further process the film 106. In one embodiment, the processing solution 324 includes a fixing agent. As discussed previously, the fixing agent dissolves the silver halide into a substantially transparent silver compound. This has the effect of slightly reducing the opacity of the film 106, but substantially eliminating the sensitivity of the film 106 to any type of light. In another embodiment, the processing solution 324 includes a bleaching agent. The bleaching agent converts the metallic silver within the film 106 into silver halide. As a result, the opacity of the film 106 is greatly reduced, but the sensitivity of the film 106 to light is not substantially reduced. In yet another embodiment, both a bleaching agent and a fixing agent are applied to the film 106, individually or as a mixture referred to as blix (combines functions of a bleaching and fixing) is applied to the film 106. This has the effect of substantially reducing the opacity of the film 106 and also substantially reducing the sensitivity of the film 106 to light. The processing solution 324 may also include an aqueous solution, stop solution, stabilizer solution, or any other suitable film processing solution without departing from the scope of the invention.

FIG. 3B-2 illustrates a processing station 322b that operates to chill the developing film 106. Chilling the developing film 106 substantially slows the chemical developing action of the processing solution 204. In the embodiment illustrated, the processing station 322b comprises an electrical cooling roller 326 and insulation shield 328. In this embodiment, the cooling roller 326 is electronically maintained at a cool temperature that substantially arrests the chemical reaction of the processing solution 304. The insulation shield 328 substantially reduces the environmental heat transfer to the cooling roller 326. The processing station 322b may comprise any other suitable system and device for chilling the developing film 106.

Figures 3, 3B:
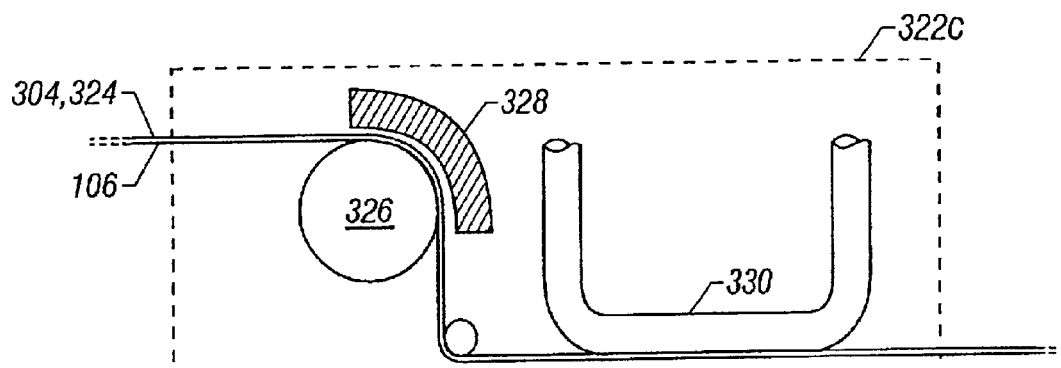
Figures 3, 3B, 4:
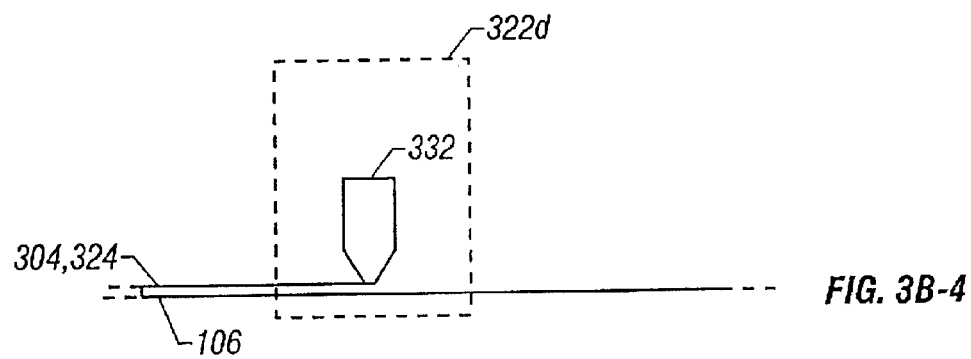

FIG. 3B-3 illustrates a processing station 322c that operates to dry the processing solution 304 on the coated film 106. Drying the processing solution 304 substantially stops further development of the film 106 and may also decrease the opacity of the film 106. In the embodiment illustrated, the processing station 322c comprises an optional cooling roller 326, as described in FIG. 3B-2, and a drying system 330. Although heating the coated film 106 would facilitate drying the processing solution 304, the higher temperature would also have the effect of accelerating the chemical reaction of the processing solution 304 and film 106. Accordingly, in the preferred embodiment, the film 106 is cooled to retard the chemical action of the processing solution 304 and then dried to effectively freeze-dry the coated film 106. Although chilling the film 106 is preferred, heating the film 106 to dry the film 106 can also be accomplished by incorporating the accelerated action of the processing solution 304 into the development time for the film 106. In another embodiment in which a suitable processing solution 324 is applied to the film 106, the chemical action of the processing solution 304 is already minimized and the film 106 can be dried using heat without substantially effecting the development of the film 106. As illustrated, the drying system 330 circulates air over the film 106 to dry the processing solution 304 and depending upon the embodiment, the processing solution 324 onto the film 106. The processing station 322c may comprise any other suitable system for drying the film 106.

FIG. 3B-4 illustrates a processing station 322d that operates to substantially remove excess processing solution 304, and any excess processing solution 324, from the film 106. The processing station 322d does not remove the solutions 304, 324 that are absorbed into the film 106. In other words, even after the wiping action, the film 106 includes some processing solutions 304, 324, and does not substantially remove any silver compounds within the film 106. Removing any excess processing solution 304 will retard the continued development of the film 106. In addition, wiping any excess processing solutions 304, 324 from the film 106 may improve the light reflectance and transmissivity properties of the coated film 106. In particular, removal of the excess processing solutions 304, 324 may reduce any surface irregularities in the coating surface, which can degrade the scanning operation. In the embodiment illustrated, the processing station 322d comprises a wiper 332 operable to substantially remove excess processing solution 304 and any processing solution 324. In a particular embodiment, the wiper 332 includes an absorbent material that wicks away the excess processing solutions 304, 324. In another embodiment, the wiper 332 comprises a squeegee that mechanically removes substantially all the excess processing solutions 304, 324. The processing station 322d may comprise any suitable device or system operable to substantially remove any excess processing solutions 304, 324.

Although specific embodiments of the processing station 322 have been described above, the processing station 322 may comprise any suitable device or system for further processing the film 106. In particular, the processing station 322 may comprise any suitable combination of the above embodiments. For example, the processing station 322 may comprise an applicator station 300b for applying a halt solution 324, a cooling roller 326, and a drying system 330. As another example, the processing station 322 may comprise a wiper 332 and a drying system 330.

FIG. 4A illustrates one embodiment of the scanning system 224. Scanning system 224 comprises one or more scanning stations 400. Individual scanning stations 400 may have the same or different architectures and embodiments. Each scanning station 400 comprises a lighting system 402 and a sensor system 404. The lighting system 402 includes one or more light sources 406 and optional optics 408. The sensor system 404 includes one or more detectors 410 and optional optics 412. In operation, the lighting system 402 operates to produce suitable light 420 that is directed onto the film 106. The sensor system 404 operates to measure the light 420 from the film 106 and produce sensor data 206 that is communicated to the to the data processing system 202.

Each scanning station 400 utilizes electromagnetic radiation, i.e., light, to scan the film 106. Individual scanning stations 400 may have different architectures and scan the film 106 using different colors, or frequency bands (wavelengths), and color combinations. In particular, different colors of light interact differently with the film 106. Visible light interacts with the dye image and silver within the film 106. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 400 may utilize other suitable colors and wavelengths (frequency) ranges without departing from the spirit and scope of the invention.

The light source 406 may comprise one or more devices or a system that produces suitable light 420. In the preferred embodiment, the light source 406 comprises an array of light-emitting diodes (LEDs). In this embodiment, different LEDs within the array may be used to produce different colors of light 420, including infrared light. In particular, specific colors of LEDs can be controlled to produce short duration pulses of light 420. In another embodiment, the light source 406 comprises a broad spectrum light source 406, such as a fluorescent, incandescent, tungsten-halogen, direct gas discharge lamps, and the like. In this embodiment, the sensor system 404 may include filters for spectrally separating the colors of light 420 from the film 106. For example, as described below, a RGB filtered trilinear array of detectors may be used to spectrally separate the light 420 from the film 106. In another embodiment of a broad-spectrum light source, the light source 406 includes a filter, such as a color wheel, to produce the specified colors of light 420. In yet another embodiment, the light source 406 comprises a point light source, such as a laser. For example, the point light source may be a gallium arsenide or an indium gallium phosphide laser. In this embodiment, the width of the laser beam is preferably the same size as a pixel on the film 106 (~12 microns). Filters, such as a color wheel, or other suitable wavelength modifiers or limiters maybe used to provide the specified color or colors of light 420.

Optional optics 408 for the lighting system 402 directs the light 420 to the film 106. In the preferred embodiment, the optics 408 comprises a waveguide that directs the light 420 onto the film 106. In other embodiment, the optics 408 includes a lens system for focusing the light 420. In a particular embodiment, the lens system includes a polarizing filter to condition the light 420. The optics 408 may also include a light baffle 422a. The light baffle 422a constrains illumination of the light 420 within a scan area in order to reduce light leakage that could cause fogging of the film 106. In one embodiment, the light baffle 422a comprises a coated member adjacent the film 106. The coating is generally a light absorbing material to prevent reflecting light 420 that could cause fogging of the film 106.

The detector 410 comprises one or more photodetectors that convert light 420 from the film 106 into data signals 216. In the preferred embodiment, the detector 410 comprises a linear charge coupled device (CCD) array. In another embodiment, the detector 410 comprises an area array. The detector 410 may also comprise a photodiode, phototransistor, photoresistor, and the like. In addition, the detector 410 may utilize time delay integration (TDI) to improve the accuracy detector 410. The detector 410 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 420. Other suitable types of filters may be used. For example, a hot mirror and a cold mirror can be used to separate infrared light from visible light.

Optional optics 412 for the sensor system 404 directs the light 420 from the film 106 onto the detector 410. In the preferred embodiment, the optics 412 comprises a lens system that directs the light 420 from the film 106 onto the detector 410. In a particular embodiment, the optics 412 include polarized lenses. The optics 412 may also include a light baffle 422b. The light baffle 422b is similar in function to light baffle 422a to help prevent fogging of the film 106.

As discussed previously, individual scanning stations 400 may have different architectures. For example, light 420 sensed by the sensor system 404 may be transmitted light or reflected light. Light 420 reflected from the film 106 is generally representative of the emulsion layer on the same side of the film 106 as the sensor system 404. Specifically, light 420 reflected from the front side (emulsion side) of the film 106 represents the blue sensitive layer and light 420 reflected from the back side of the film 106 represents the red sensitive layer. Light 420 transmitted through the film 106 collects information from all layers of the film 106. Different colors of light 420 are used to measure different characteristics of the film 106. For example, visible light interacts with the dye image and silver within the film 106, and infrared light interacts with the silver in the film 106.

Different architectures and embodiments of the scanning station 400 may scan the film 106 differently. In particular, the lighting system 402 and sensor system 404 operate in concert to illuminate and sense the light 420 from the film 106 to produce suitable sensor data 206. In one embodiment, the lighting system 402 separately applies distinct colors of light 420 to the film 106. In this embodiment, the sensor system 404 generally comprises a non-filtered detector 410 that measures in series the corresponding colors of light 420 from the film 106. In another embodiment, multiple unique color combinations are simultaneously applied to the film 106, and individual color records are derived from the sensor data 206. In another embodiment, the lighting system 402 simultaneously applies multiple colors of light 420 to the film 106. In this embodiment, the sensor system 404 generally comprises a filtered detector 410 that allows the simultaneous measurement of individual colors of light 420. Other suitable scanning methods may be used to obtain the required color records.

The use of the processing station 322 may improve the scanning properties of the film 106 in addition to retarding or substantially stopping the continued development of the film 106. For example, the amount of light 420 transmitted through the film 106 is negatively affected by the opacity of the film 106. In other words, the greater the opacity of the film 106 the lower the amount of light 420 transmitted through the film 106. Both the silver image and silver halide within the film 106 occlude light 420. On the whole, the silver image within the film 106 absorbs light 420, and the silver halide reflects light 420. As described above, the processing solutions 324 may be used to modify opacity of the film 106 and improve the scanning properties of the film 106.

Figures 3, 4B:
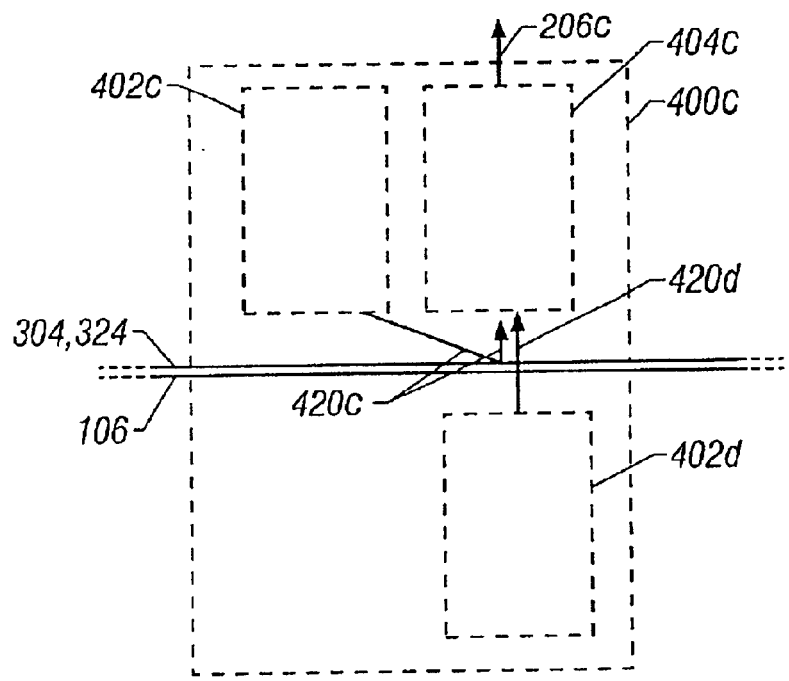
Figures 4, 4B:
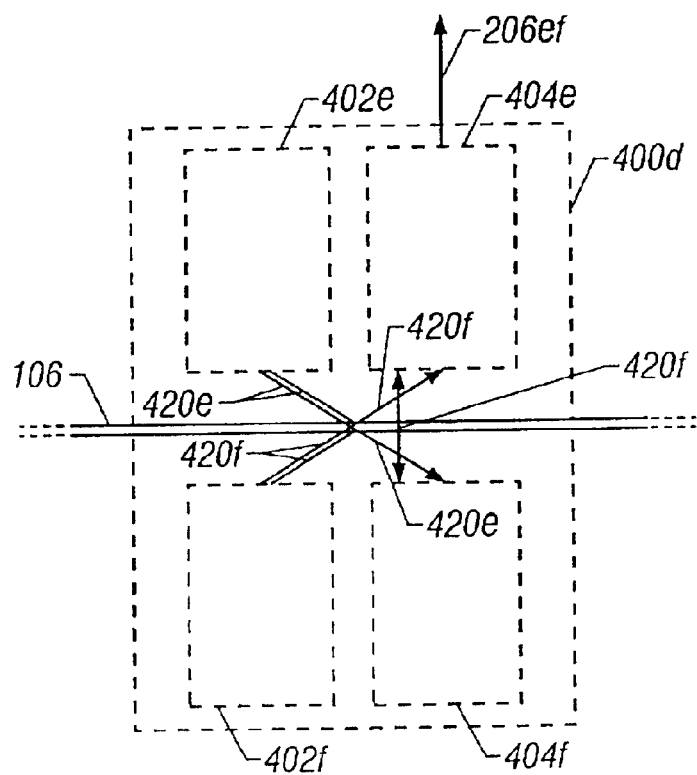

Specific examples of scanner station 400 architectures are illustrated in FIGS. 4B-1–4B-4. The scanning system 224 may comprise any illustrated example, combination of examples, or other suitable methods or systems for scanning the film 106 without departing from the scope and spirit of the invention. FIG. 4B-1 illustrates one embodiment of a scanning station 400a having a transmission architecture. As illustrated, the transmission scanning station 400a comprises a lighting system 402a and a sensor system 404a. Lighting system 402a produces light 420a that is transmitted through the film 106 and measured by the sensor system 404a. The sensor system 404a produces sensor data 206a that is communicated to the data processing system 202.

Lighting system 402a and sensor system 404a are similar in design and function as lighting system 402 and sensor system 404, respectively. The visible light 420a may comprise broadband visible light, individual visible light colors, or combinations of visible light colors. In an embodiment in which the light 420a comprises broadband visible light, the sensor system 404a will preferably comprise a red, green and blue tri-linear array. In this embodiment, the sensor system 404a can simultaneously measure the red, green and blue components of light 420a from the film 106. In another embodiment, the light 420a comprises pulses of red, green and blue light, and the sensor system 404a preferably comprises an unfiltered detector operable to measure the pulses of light 420a from the film 106. In this embodiment, the color of the light 420a changes and the sensor system 404a measures the respective light pulses from the film 106.

In one embodiment of the scanning station 400a, the light 420a produced by the lighting system 402a comprises visible light. The visible light 420a interacts with at least one dye cloud within the film 106 and any silver occlusions contained in the film 106. In particular, depending upon the embodiment of the development system 222, the film 106 may include silver forming an optical occlusion, such as metallic silver grains, silver halide, or both, but does not include silver compounds formed as a result of fixing the silver halide contained within the film 106.

The visible light 420a interacts with the magenta, cyan and yellow dye images within the film 106, as well as any silver occlusions within the film 106, the sensor system 404a records the intensity of visible light 420a from the film 106 and produces sensor data 206a. The sensor data 206a generally comprises a red, green, and blue record corresponding to the cyan, magenta, and yellow dye images, respectively. Depending upon the development process, each of the red, green, and blue records may include a silver record. Specifically, any metallic silver grains or silver halide within the film 106 partially occludes the visible light 420a transmitted through the film 106. Depending upon the severity of the occlusions, the red, green, and blue records are processed by the data processing system 102 to correct for the occlusion in the film 106.

In the preferred embodiment of the transmission scanning station 400a, the light 420a produced by the lighting system 402a comprises visible light and infrared light. As discussed above, the visible light may comprise broadband visible light, individual visible light colors, or combinations of visible light colors. The infrared light may comprise infrared, near infrared, or any suitable combination thereof. The visible light 420a interacts with the dye images, i.e. cyan, magenta, or yellow, within the film 106 and any silver to produce a red, green, and/or blue record that includes a silver record. The infrared light interacts with the silver, and any other occlusions, within the film 106 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled System and Method for Image Recovery, which is hereby incorporated herein by reference.

In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 400a, the light produced by the lighting system 402a comprises only infrared and/or near infrared light. In this embodiment, the infrared light 420a interacts with occlusions within the film 106 but does not substantially interact with the dye images within the film 106. In this embodiment, the sensor data 206a does not spectrally distinguish the magenta, cyan, and yellow dye images. An advantage of this embodiment is that the infrared light 420a does not fog the film 106. In a particular embodiment, the advantage of not fogging the film 106 allows the film 106 to be scanned at multiple development times without significantly fogging the film 106. In this embodiment, the scanning station 400a can be used to determine the optimal development time for the film 106. This embodiment may also be used to scan the silver image.

FIG. 4B-1 illustrates the light 420a being transmitted through the film 106 from the backside to the front side of the film 106. The light 420a can also be transmitted through the film 106 from the front side to the backside of the film 106 without departing from the scope of the invention.

FIG. 4B-2 illustrates one embodiment of a scanning station 400b having a reflective architecture. The reflective scanning station 400b comprises a lighting system 402b and a sensor system 404b. Lighting system 402b produces light 420b that is reflected from the film 106 and measured by the sensor system 404b. The scanning station 400b generally requires silver halide to be present within the film 106. The silver halide scatters and reflects the light 420b measured by the sensor system 404b. The sensor system 404b produces sensor data 206b that is communicated to the data processing system 202. Lighting system 402b and sensor system 404b are similar to lighting system 402 and sensor system 404, respectively.

In one embodiment of the reflective scanning station 400b used to scan the blue emulsion layer of the film 106, the light 420b produced by the lighting system 402b comprises blue light. In this embodiment, the blue light 420b scans the silver and dye image within the blue layer of the film 106. The blue light 420b interacts with the yellow dye image and also the silver in the blue emulsion layer. In particular, the blue light 420b is reflected from the silver halide and measured by the sensor system 404b to produce a blue record. Many conventional films include a yellow filter below the blue emulsion layer that blocks the blue light 420a from illuminating the other emulsion layers of the film 106. As a result, noise created by cross-talk between the blue emulsion layer and the red and green emulsion layers is substantially reduced.

In another embodiment of the reflective scanning station 400b used to scan the blue emulsion layer of the film 106, the light 420b produced by the lighting system 402b comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 106. In this embodiment, the non-blue light 420b interacts with the silver image in the blue emulsion layer of the film 106, but is transparent to the yellow dye within the blue emulsion layer of the film 106. This embodiment is prone to higher noise levels created by cross-talk between the blue and green emulsion layers of the film 106.

In yet another embodiment of the reflective scanning station 400b, the light 420b produced by the lighting system 402b comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 106. In this embodiment, the sensor system 404b generally comprises a filtered detector 410b (not expressly shown) that measures the red, green, blue, and infrared light 420b from the film 106 to produce red, green, blue, and infrared records as sensor data 206b.

Although the scanning station 400b is illustrated with the lighting system 402b and the sensor system 404b located on front side of the film 106, the lighting system 402b and the sensor system 404b may also be located on the back side of the film 106. In this embodiment, the light 420b produced by the lighting system 402b may comprise red light. The red light largely interacts with the cyan dye image and silver in the red emulsion layer of the film 106 to produce a red record of the sensor data 206b.

FIG. 4B-3 illustrates one embodiment of a scanning station 400c having a transmission-reflection architecture. The transmission-reflection architecture is the preferred embodiment of the scanning system 224. In this embodiment, the scanning station 400c comprises a first lighting system 402c, a second lighting system 402d, and a sensor system 404c. In the preferred embodiment, the lighting system 402c operates to illuminate the front side of the film 106 with light 420c, the second lighting system 402d operates to illuminate the backside of the film 106 with light 420d, and the sensor system 404c operates to measure the light 420c reflected from the film 106 and the light 420d transmitted through the film 106. Based on the measurements of the light 420b, 420d, the sensor system 404c produces sensor data 206c that is communicated to the data processing system 102. Lighting system 402c and 402d are similar to lighting system 402, and sensor system 404c is similar to the sensor system 404, Although scanning station 400c is illustrated with lighting systems 402c, 402d, a single light source may be used to produce light that is directed through a system of mirrors, shutters, filters, and the like, to illuminate the film 106 with the front side of the film 106 with light 420c and illuminate the back side of the film 106 with light 420d. The light 420c, 420d may comprise any color or color combinations, including infrared light.

This embodiment of the scanning station 400c utilizes many of the positive characteristics of the transmission architecture scanning station 400a and the reflection architecture scanning station 400b. For example, the blue emulsion layer is viewed better by light 420c reflected from the film 106 than by light 420d transmitted through the film 106; the green emulsion layer is viewed better by light 420d transmitted through the film 106 than by light 420c reflected from the film 106; and the red emulsion layer is adequately viewed by light 420d transmitted through the film 106. In addition, the cost of the scanning station 400c is minimized through the use of a single sensor system 404c.

In the preferred embodiment of the scanning station 400c, the light 420c comprises blue light, and light 420d comprises red, green, and infrared light. The blue light 420c interacts with the yellow dye image and silver in the blue emulsion layer of the film 106. The sensor system 404c measures the light 420c from the film 106 and produces a blue-silver record. The red and green light 420d interacts with the cyan and magenta dye images, respectively, as well as the silver in the film 106. The infrared light 420d interacts with the silver, but does not interact with the dye clouds within the film 106. As discussed previously, the silver contained within the film 106 may comprise silver grains, silver halide, or both. The red, green, and infrared light 420d transmitted through the film 106 is measured by the sensor system 404c, which produces a red-silver, green-silver, and silver record. The blue-silver, red-silver, green-silver, and silver records form the sensor data 206c that is communicated to the data processing system 202. The data processing system 202 utilizes the silver record to facilitate removal of the silver component from the red, green, and blue records.

In another embodiment, the light 420c comprises blue light and infrared light, and light 420d comprises red, green, and infrared light. As discussed previously, the blue light 420c mainly interacts with the yellow dye image and silver within the blue emulsion layer of the film 106. The infrared light 420c interacts with mainly the silver in the blue emulsion layer of the film 106. The sensor system 404c measures the blue and infrared light 420c from the film 106 and produces a blue-silver record and a front side silver record, respectively. The red, green, and infrared light 420d interact with the film 106 and are measured by the sensor system 404c to produce red-silver, green-silver and transmitted-silver records as discussed above. The blue-silver, red-silver, green-silver, and both silver records form the sensor data 206c that is communicated to the data processing system 202. In this embodiment, the data processing system 202 utilizes the front side silver record of the blue emulsion layer to facilitate removal of the silver component from the blue-silver record, and the transmission-silver record is utilized to facilitate removal of the silver component from the red and green records.

Although the scanning station 400c is described in terms of specific colors and color combinations of light 420c and light 420d, the light 420c and light 420d may comprise other suitable colors and color combinations of light without departing from the scope of the invention. For example, light 420c may comprise non-blue light, infrared light, broadband white light, or any other suitable light. Likewise, light 420d may include blue light, broadband white light, or another other suitable light. Scanning station 400c may also comprise other suitable embodiments without departing from the scope of the invention. For example, although the scanning station 400c is illustrated with two lighting systems 402 and a single sensor system 404, the scanning station 400c could be configured with a single lighting system 402 and two sensor systems 404, wherein one sensor system measures light 420 reflected from the film 106 and the second sensor system 404 measures light 420 transmitted through the film 106. In addition, as discussed above, the scanning station 400 may comprise a single lighting system that illuminates the film 106 with light 420c and light 420d.

FIG. 4B-4 illustrates an embodiment of a scanning station 400d having a reflection-transmission-reflection architecture. In this embodiment, the scanning station 400d comprises a first lighting system 402e, a second lighting system 402f, a first sensor system 404e, and a second sensor system 404f. In the embodiment illustrated, the lighting system 402e operates to illuminate the front side of the film 106 with light 420e, and the second lighting system 402f operates to illuminate the back side of the film 106 with light 420f. The first sensor system 404e operates to measure the light 420e reflected from the film 106 and the light 420f transmitted through the film 106, and the second sensor system 404f operates to measure the light 420f reflected from the film 106 and the light 420e transmitted through the film 106. Based on the measurements of the light 420e and 420f, the sensor systems 404e, 404f produce sensor data 206ef that is communicated to the data processing system 202. Lighting systems 402e, 402f are similar to lighting systems 402, and sensor systems 404e, 404f are similar to the sensor system 404. Although scanning station 400d is illustrated with lighting systems 402e, 402f, and sensor systems 404e, 404f, a single lighting system and/or sensory system, respectively, may be used to produce light that is directed through a system of mirrors, shutters, filters, and the like, to illuminate the film 106 with the front side of the film 106 with light 420e and illuminate the backside of the film 106 with light 420f.

This embodiment of the scanning station 400d expands upon the positive characteristics of the transmission-reflection architecture of scanning station 400c. For example, as discussed in reference to FIG. 4B-3, the blue emulsion layer is viewed better by light 420e reflected from the film 106 and the green emulsion layer is viewed better by light 420e or 420f transmitted through the film 106. Second sensor system 404f allows viewing of the red emulsion layer by light 420f reflected from the film 106, which generally produces better results than viewing the red emulsion layer by light 420e or light 420f transmitted through the film 106.

In one embodiment of the scanning station 400d, the light 420e and 420f comprises light within the infrared portion of the electromagnetic spectrum. In this embodiment, the sensor system 404e measures light 420e reflected from the front emulsion layer and light 420f transmitted through the film 106. The sensor system 404f measures light 420f reflected from the back emulsion layer and light 420e transmitted through the film 106. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 400d, the sensor systems 404e, 404f include a trilinear array of filtered detectors, and the light 420e and the light 420f comprises broadband white light and infrared light. The trilinear array operates to simultaneously measure the individual red, green, and blue components of the broadband white light 420e, 420f. The infrared light is measured separately and can be measured through each filtered detector 410 of the sensor systems 404e, 404f. The broadband white light 420e, 420f interacts with the silver and magenta, cyan, and yellow color dyes in the film 106, respectively, and the infrared light 420e, 420f interacts with the silver within the film 106. The reflected white light 420e measured by the first sensor system 404e includes information corresponding to the yellow dye image and the silver in the blue emulsion layer of the film 106. In particular, the blue component of the broadband white light 420e measured by the blue detector of the sensor system 404e corresponds to the yellow dye image, and the non-blue components of the broadband white light 420e measured by the red and green detectors corresponds to the red and green dye images and all the silver within the emulsion layers of the film 106.

Similarly, the red component of the broadband white light 420f measured by the red detector of the sensor system 404f corresponds largely to the cyan dye image, and the non-red components of the broadband white light 420e measured by the blue and green detectors corresponds to the yellow and magenta dye images and all the silver within the emulsion layers of the film 106. The white light 420e, 420f transmitted through the film 106 interacts with each color dye image and silver within the film 106, and the red, green, and blue light components are measured by the red, green, and blue detectors of the sensor systems 404e, 404f to produce individual red, green and blue light records that include the silver record. The infrared light 420e reflected from the film 106 and measured by the sensor system 404e corresponds largely to the silver in the blue emulsion layer of the film 106, and the infrared light 4201 reflected from the film 106 and measured by the sensor system 404f largely corresponds to the silver in the red emulsion layer of the film 106. The infrared light 420e, 420f transmitted through the film 106 measured by the sensor systems 404e, 404f corresponds to the silver in the red, green, and blue emulsion layers of the film 106. The individual measurements of the sensor systems 404e, 404f are communicated to the data processing system 202 as sensor data 206ef. The data processing system 202 processes the sensor data 206ef and constructs the digital image 108 using the various sensor system measurements. For example, the blue signal value for each pixel can be calculated using the blue detector data from the reflected light 420e and the blue detector data from the transmitted light 420f, as modified by non-blue detector data from the reflected light 420e, and the non-blue detector data from the transmitted light 420e or 420f. The red and green signal values for each pixel can be similarly calculated using the various measurements.

In another embodiment of the scanning station 400d, the sensor systems 404e, 404f include a trilinear array of filtered detectors, and the light 420e and the light 420f comprises broadband white light. This embodiment of the scanning station 400d operates in a similar manner as discussed above, with the exception that infrared light is not measured or used to calculate the digital image 108.

Although the scanning station 400d is described in terms of a specific colors and color combinations of light 420e and light 420f, the light 420e and light 420f may comprise other suitable colors and color combinations of light without departing from the scope of the invention. Likewise, the scanning station 400d may comprise other suitable devices and systems without departing from the scope of the invention.

Although various embodiments of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A customer operated self-service film processing system comprising:

a display viewable by the customer; and a film processing system operable to receive undeveloped film, wherein the film processing system develops the undeveloped film and digitizes the developed film to produce digital images that are displayable on the display for being viewed by the customer and wherein the film processing system digitizes the developed film in a system-automated manner in response to the undeveloped film being developed.

2. The customer operated self-service film processing system of claim 1, further comprising a payment system operable to receive payment from the customer.

3. The customer operated self-service film processing system of claim 2, wherein the payment system comprises a magnetic card reader.

4. The customer operated self-service film processing system of claim 3, wherein the magnetic card reader operates to read information from a credit card.

5. The customer operated self-service film processing system of claim 3, wherein the magnetic card reader operates to read information from a pre-paid card.

6. The customer operated self-service film processing system of claim 2, wherein the payment system comprises a bar-code reader.

7. The customer operated self-service film processing system of claim 2, wherein the payment system comprises a currency receptacle operable to receive currency.

8. The customer operated self-service film processing system of claim 1, further comprising a printing system.

9. The customer operated self-service film processing system of claim 8, wherein the printing system comprises an ink-jet printer.

10. The customer operated self-service film processing system of claim 8, wherein the printing system comprises a dye-sublimation printer.

11. The customer operated self-service film processing system of claim 8, wherein the printing system comprises a photographic print processing system.

12. The customer operated self-service film processing system of claim 8, wherein the customer chooses the digital images to print.

13. The customer operated self-service film processing system of claim 8, wherein the printing system comprises an integral printing system.

14. The customer operated self-service film processing system of claim 8, wherein the printing system comprises a remote printing system.

15. The customer operated self-service film processing system of claim 14, wherein the remote printing system produces prints that are sent to the customer.

16. The customer operated self-service film processing system of claim 14, wherein the remote printing system produces prints that are picked-up by the customer.

17. The customer operated self-service film processing system of claim 1, further comprising a printer operable to produce a receipt.

18. The customer operated self-service film processing system of claim 1, further comprising an image input device.

19. The customer operated self-service film processing system of claim 18, wherein the image input device operates to receive image data from a digital camera.

20. The customer operated self-service film processing system of claim 18, wherein the image input device comprises a flash card reader.

21. The customer operated self-service film processing system of claim 18, wherein the image input device comprises a flatbed scanner.

22. The customer operated self-service film processing system of claim 18, wherein the image input device comprises a film scanner.

23. The customer operated self-service film processing system of claim 18, wherein the image input device comprises a memory device.

24. The customer operated self-service film processing system of claim 23, wherein the memory device comprises a CD reader.

25. The customer operated self-service film processing system of claim 23, wherein the memory device comprises a DVD reader.

26. The customer operated self-service film processing system of claim 18, wherein the image input device comprises a communications port operable to receive image data.

27. The customer operated self-service film processing system of claim 26, wherein the communications port is connected to the Internet.

28. The customer operated self-service film processing system of claim 18, further comprising a printing system operable to print image data received from the image input device.

29. The customer operated self-service film processing system of claim 18, further comprising a communications port operable to communicate image data received from the image input device.

30. The customer operated self-service film processing system of claim 1, wherein the display comprises a touch screen display.

31. The customer operated self-service film processing system of claim 1, further comprising a customer input device.

32. The customer operated self-service film processing system of claim 31, wherein the customer input device comprises a keypad.

33. The customer operated self-service film processing system of claim 31, wherein the customer input device comprises a touch screen.

34. The customer operated self-service film processing system of claim 1, wherein the film processing system includes image enhancement software.

35. The customer operated self-service film processing system of claim 34, wherein the customer chooses between-enhanced image and an enhanced image.

36. The customer operated self-service film processing system of claim 1, wherein the film processing system comprises a wet chemistry film processing system.

37. The customer operated self-service film processing system of claim 1, wherein the film processing system comprises a digital film processing system.

38. The customer operated self-service film processing system of claim 37, wherein the digital film processing system comprises:
a development system operable to develop the film;
a scanning system operable to scan the developed film with visible light and produce sensor data;
a data processing system operable to receive the sensor data and produce the digital images.

39. The customer operated self-service film processing system of claim 38, wherein the visible light comprise red and green light transmitted through the developed film.

40. The customer operated self-service film processing system of claim 38, wherein the scanning system also operates to scan the undeveloped film with infrared light.

41. The customer operated self-service film processing system of claim 1, further comprising an archive memory system operable to store the digital images.

42. The customer operated self-service film processing system of claim 41, further comprising a communications port operable to provide remote access to the digital images.

43. The customer operated self-service film processing system of claim 42, wherein remote access is provided through an Internet web site.

44. The customer operated self-service film processing system of claim 1, further comprising a memory system operable to store the digital images on a storage media provided to the customer.

45. The customer operated self-service film processing system of claim 44, wherein the storage media comprises a CD.

46. The customer operated self-service film processing system of claim 44, wherein the storage media comprises a DVD.

47. A self-service digital film processing system comprising:
a customer interface having a display and a film receptacle operable to receive undeveloped film from a customer;
a development system operable to coat a processing solution onto the undeveloped film and develop the film;
a scanning system operable to scan the coated developed film and produce sensor data in a system-automated manner in response to the undeveloped film being developed; and
a data processing system operable to receive the sensor data and produce digital images that are displayable on the display for being viewed by the customer.

48. The self-service digital film processing system of claim 47, wherein the display comprises a touch screen display.

49. The self-service digital film processing system of claim 47, wherein the customer interface further comprises a sound system.

50. The self-service digital film processing system of claim 47, wherein the customer interface further comprises a customer input device.

51. The self-service digital film processing system of claim 50, wherein the customer input device comprises a keypad.

52. The self-service digital film processing system of claim 47, wherein the customer interface further comprises a payment system.

53. The self-service digital film processing system of claim 52, wherein the payment system operates to read a credit card.

54. The self-service digital film processing system of claim 52, wherein the payment system operates to read a prepaid photoprocessing card.

55. The self-service digital film processing system of claim 52, wherein the payment system operates to read a receipt.

56. The self-service digital film processing system of claim 47, further comprising one or more output devices.

57. The self-service digital film processing system of claim 56, wherein at least one of the output devices comprises a printer.

58. The self-service digital film processing system of claim 57, wherein the printer comprises an ink-jet printer.

59. The self-service digital film processing system of claim 57, wherein the printer comprises a dye-sublimation printer.

60. The self-service digital film processing system of claim 57, wherein the printer operates to produce photographic print.

61. The self-service digital film processing system of claim 57, wherein the printer comprises an external printer.

62. The self-service digital film processing system of claim 56, wherein at least one of the output devices comprises a memory device operable to store one or more digital images on a storage media.

63. The self-service digital film processing system of claim 62, wherein the storage media comprises a CD.

64. The self-service digital film processing system of claim 62, wherein the storage media comprises a DVD.

65. The self-service digital film processing system of claim 56, wherein at least one of the output devices comprises a communication network operable to output the digital images.

66. The self-service digital film processing system of claim 65, wherein the communication network operates in conjunction with an Internet web site.

67. The self-service digital film processing system of claim 47, further comprising one or more image input devices.

68. The self-service digital film processing system of claim 67, wherein at least one of the image input devices comprises a scanner.

69. The self-service digital film processing system of claim 67, wherein at least one of the image input devices comprises a signal input.

70. The self-service digital film processing system of claim 69, wherein the signal input operates to receive image data from a digital camera.

71. The self-service digital film processing system of claim 69, wherein the signal input operates to receive image data from a flash card.

72. The self-service digital film processing system of claim 67, wherein at least one of the image input devices comprises a communication network.

73. The self-service digital film processing system of claim 72, wherein the communication network operates in conjunction with an Internet web site.

74. A method for allowing a customer to process their own photographic film comprising:
   inserting undeveloped film into a self-service film processing system;
   developing the film within the self-service film processing system;
   scanning the developed film within the self-service film processing system to produce digital images, wherein said scanning data is performed in a system-automated manner in response to developing the undeveloped film; and
   displaying one or more of the digital images on a visual display of the self-service film processing system.

75. The method of claim 74, further comprising displaying the digital images and enhanced digital images to the customer to allow the customer to choose between the digital images and the enhanced digital images.

76. The method of claim 74, further comprising printing one or more of the digital images.

77. The method of claim 74, further comprising saving one or more of the digital images.

78. The method of claim 74, further comprising:
   receiving customer choices regarding the digital images to be output; and
   outputting the chosen digital images.

79. The method of claim 78, wherein the chosen digital images are output to a printer.

80. The method of claim 78, wherein the chosen digital images are output to a communications network.

81. The method of claim 78, wherein the chosen digital images are output to a memory device.

82. The method of claim 74, wherein the self-service film processing system develops the film using wet chemistry film processing methods.

83. The method of claim 74, wherein the self-service film processing system develops the film using digital film processing methods.

84. The method of claim 74, further comprising accepting payment from the customer at the self-service film processing system.

85. A sell-service film processing station comprising:
   a display viewable by a customer;
   a film processing system operable to receive undeveloped film from the customer, wherein the film processing system develops the undeveloped film and digitizes the developed film to produce digital images that are displayable on the display for being viewed by the customer and wherein the film processing system digitizes the developed film in a system-automated manner in response to the undeveloped film being developed;
   a customer input device operable to receive customer choices regarding which digital images to print; and
   a printer operable to print the customer chosen digital images.

86. The self-service film processing station of claim 85, further comprising one or more image input devices operable to receive digital images.

87. The self-service film processing station of claim 86, wherein at least one of the image input devices comprises a digital camera memory device.

88. The self-service film processing station of claim 86, wherein at least one of the image input devices comprises a scanner.

89. The self-service film processing station of claim 85, further comprising one or more payment systems operable to receive payment information from the customer.

90. The self-service film processing station of claim 89, wherein at least one of the payment systems comprises a magnetic card reader.

91. The self-service film processing station of claim 85, wherein the printer comprises an ink-jet printer.

92. The self-service film processing station of claim 85, wherein the printer operates to produce photographic prints.

93. A prepaid photoprocessing card comprising:
   a media; and
   an encoded data device coupled to the media, the encoding data device contains information designating a money balance available for payment in a self-service film processing system.

94. The prepaid photoprocessing card of claim 93, wherein the encoded data device also contains demographic data stored on the encoded data device prior to use of the prepaid photoprocessing card by the customer.

95. The prepaid photoprocessing card of claim 94, wherein the demographic data is communicated by the self-service film processing system to a marketing center each time the prepaid photoprocessing card is used by the customer.

* * * * *

UNITED STATES PATENT AND TRADEMARK OFFICE
CERTIFICATE OF CORRECTION

PATENT NO. : 6,786,655 B2
DATED : September 7, 2004
INVENTOR(S) : Stacy S. Cook et al.

It is certified that error appears in the above-identified patent and that said Letters Patent is hereby corrected as shown below:

Column 25,
Line 38, change the first occurrence of "enhanced image" to -- an un-enhanced image --

Signed and Sealed this

First Day of February, 2005

JON W. DUDAS
*Director of the United States Patent and Trademark Office*